Nov. 3, 1964     J. M. ZEIGLER     3,155,115
CAM OPERATED TILTING VALVES

Filed March 28, 1962     3 Sheets-Sheet 1

INVENTOR.
John M. Zeigler
BY
Wood, Herron & Evans
ATTORNEYS

INVENTOR.
John M. Zeigler
BY Wood, Herron & Evans
ATTORNEYS

Nov. 3, 1964   J. M. ZEIGLER   3,155,115
CAM OPERATED TILTING VALVES
Filed March 28, 1962   3 Sheets-Sheet 3

INVENTOR.
John M. Zeigler
BY Wood, Herron & Evans
ATTORNEYS

United States Patent Office 3,155,115
Patented Nov. 3, 1964

3,155,115
CAM OPERATED TILTING VALVES
John M. Zeigler, Fairfield, Ohio, assignor to American Radiator & Standard Sanitary Corporation, New York, N.Y., a corporation of Delaware
Filed Mar. 28, 1962, Ser. No. 183,181
10 Claims. (Cl. 137—636.4)

This invention relates to faucets and more particularly to that type of faucet in which the temperature and the volume of water to be discharged are controlled by the manipulation of a single handle or knob. The invention is disclosed in relation to a faucet designed for use in a bathroom, however, it will be obvious to those skilled in the art that the principles of the invention are applicable to faucets designed for other uses, including uses in kitchens and in laundries.

The faucet of this invention employs two tippable valves. Each valve rests against a circular seat surrounding a passageway which opens from a water supply line into the hollow interior of the body of the faucet, this hollow interior constituting a mixing chamber. An elongated stem projects from each valve into the mixing chamber and the valves are opened by deflecting the stems. By placing the two valves, one to control a hot water supply line and the other to control a cold water supply line, so that the two valve stems are in spaced relation within the mixing chamber a single instrumentality, such as a cam, may be employed to contact the valve stems and tip one, the other, or both. In this way, the volume and the temperature of water issuing from the faucet spout may be controlled within the limits of the temperature and the pressure of the water within each of the hot and cold water supply lines.

Valves of this general type are well known and they have many advantages over the ordinary bibb washer valve. They lend themselves well to single handle operation. They are held closed by the pressure of the water within the supply lines so that there is little likelihood of leakage. They are trouble free and they outlast other types of faucet valves by many years.

However, these valves do have several characteristics which create special problems in incorporating them into faucets. They are extremely sensitive, going through their entire range of from full "Off" to full "On" with slight tilting movement, a tilting movement of from 5 to 7 degrees opening the valve to maximum flow. They shut themselves off, and unless provision is made for precise control throughout each increment of their small range of movement, severe water hammering results. The tendency to be self-closing also can result in the valves themselves moving the operating handle to its closed position, so that provision must be made to hold the handle in any selected position within its entire range of movement and to do this while maintaining a smooth, easy movement for the handle as dictated by the sensitive nature of the tiltable valves.

The primary objective of this invention has been to provide a faucet structure utilizing these tipping valves, which is simple in construction, economical to manufacture, and in which the valve actuator is best positioned for convenient, easy operation, giving full consideration to the special problems posed by the use of these valves.

It has been found that the best way to overcome the sensitive nature of these valves is to separate the movement of the valve operating instrumentality which controls the volume from that movement which controls the temperature. In the faucet of this invention this has been accomplished by providing a rotatable, push-pull rod, which has been combined with a valve actuator, such that the push-pull movement controls volume whereas the rotative movement of the rod controls the temperature. This type of movement in and of itself is old, having been disclosed in Leuthesser Patent No. 2,939,484. However, in that patent the rod or shaft extended out at the back of the faucet, and the movement of the shaft was controlled by means of a lever which projected up from the back of the faucet into an excessible position. In the faucet of this invention, and in the fulfillment of the primary objective of placing the operating instrumentality in the position to be most easily and conveniently manipulated, the long operating lever of the Leuthesser patent has been discarded and in its place there is provided a simple operating knob. This knob is placed at the forward end of the faucet spout where it is closest to the operator and where its movements are most obvious to him, the push-pull movement controlling the volume, the rotation of the knob controlling temperature.

Another objective of this invention has been to provide a faucet structure which answers problems encountered by plumbers in installing fittings in new houses. In the preferred embodiment of this invention the faucet is divided into two sections. One of these sections is adapted to be installed at the time of "roughing-in," the second section is designed to be installed after roughing-in operations have been completed. All of the sensitive parts, most likely to be damaged by plaster, dust, dirt, etc. are incorporated in the second section.

Toward this end the faucet is divided horizontally into a rough-in base and into a final installation superstructure, the final installation superstructure including a decorative escutcheon which covers the rough-in base. To add to the convenience of the installation only one, simple threaded sleeve is provided to secure the two sections of the faucet together. This sleeve also, in the preferred embodiment of the invention, wherein the faucet is used for a lavatory, provides a guide sleeve for the pop-up valve rod which is typically employed in a bathroom lavatory bowl installation.

Other objectives of the invention will be readily apparent to those skilled in the art from the accompanying drawings in which:

FIGURE 4 is an enlarged fragmentary cross sectional view of the upper end of one of the valve stems.

Figure 1:
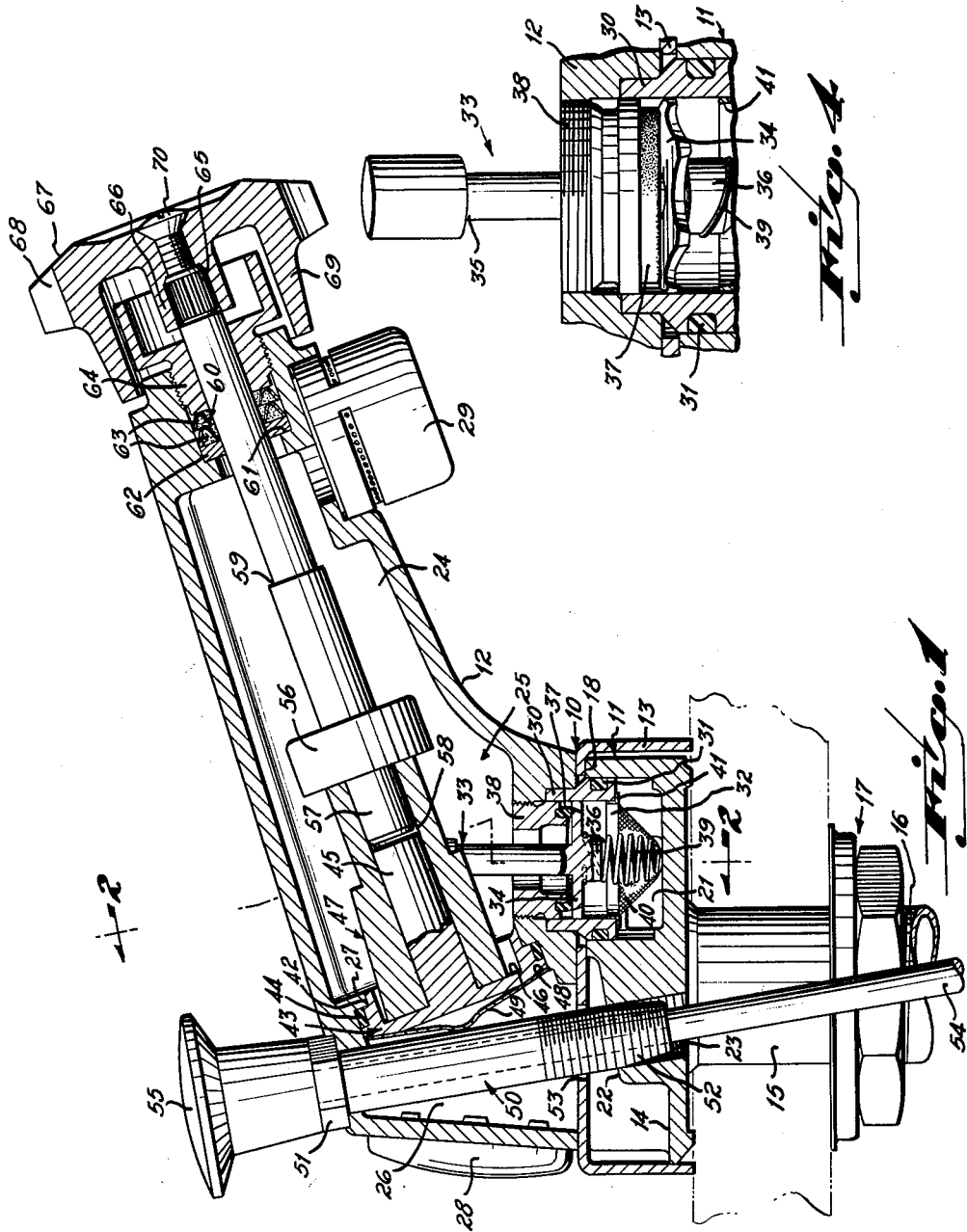
FIGURE 1 is a cross sectional view taken on a plane which passes vertically through the faucet from front to back.

The faucet construction illustrated in the drawings is divided into two sections along a horizontal plane which passes through the faucet along the line designated generally by the numeral 10 in FIGURE 1. This plane divides the faucet into an upper part designated generally 12 and a lower part designated generally 11. The lower part 11 constitutes a casting which is adapted to be installed at the time of the rough-in of the plumbing installation. In the final installation the lower part is enclosed in an escutcheon 13 which provides a finish for the complete installation. A preferred shape for this escutcheon is disclosed in copending design patent application Serial No. 69,461 filed March 28, 1962, now Des. 193,604. The upper portion 12 of the faucet, which is above the escutcheon in an installation, constitutes a casting which has a high finish and is plated.

The base casting includes a deck plate 14 having two nipples 15—15 which are cast as an integral part of the deck plate depending from the underside thereof, in this instance on standard, four inch centers. In an installation, as shown in FIGURE 1, these nipples pass down through appropriate openings in the deck of a lavatory bowl and the lower ends of these nipples are threaded as shown at 16 to receive washers and lock nuts, only one set of which is shown at 17. An enlarged boss 18 is provided at the central, forward portion of the base casting, this boss being sufficiently large to accommodate two inlets, the one shown at 19 being for hot water and the one shown at 20 being for cold water. These inlets are connected to the two nipples 15—15 by passageways 21—21, which are enclosed within the casting. Just to the rear of the large central boss 18 there is provided another, smaller boss 22 which has a threaded bore 23 therein, the function of which will be explained later.

As shown, the upper section 12 comprises essentially a hollow casting which is configurated to provide a forwardly and upwardly projecting hollow spout 24, an intermediate portion defining a mixing chamber 25 and a rearward portion 26 which is separated from the mixing chamber 25 by a transverse wall 27. The bottom of that portion of the faucet casting below the mixing chamber and below the rearmost portion 26 is essentially flat and in the final installation it fits down on top of the escutcheon. For assembly purposes, the body casting of the faucet has an opening in it at the rear which is adapted to be closed by means of a snap-in cap 28. The forward end of the faucet has a discharge outlet in it at the underside thereof which is designed to receive an aerating device 29.

The outlets 19 and 20 in the base casting are machined to provide precise seats for the valve assemblies. Inasmuch as both valve assemblies are identical only one will be described in detail. In the instance shown, each of the outlets 19-20 receives a sleeve 30 which has an annular groove in it to seat an O-ring 31. This O-ring seals the juncture between the sleeve and the base casting. The upper portion of sleeve 30 preferably is fitted into a bore of appropriate size within the bottom of the spout casting. The inner diameter of sleeve 30 provides a passageway, designated generally 32, in which the tippable valves, designated generally 33—33, are seated. These valves preferably are made of stainless steel and each comprises a disc 34 having a scalloped outer rim as best may be seen in FIGURE 4, an elongated stem 35 which projects from the upper side of disc 34, and a boss 36 which depends from the underside of the disc 34. In addition, as shown, the upper end of each stem 35 is enlarged as shown, this being done to reduce wear. The disc 34 of each of the tipping valves seats inside of the scalloped edges against a circular, resilient valve ring 37 which is embedded into the underface of the hollow bushing 38. The lower portion of this bushing resides within the upper portion of sleeve 30. The upper end of the bushing 38 is screw threaded and it is secured in this way to the faucet casting. The hollow inside of bushing 38 provides a passageway for water from the inlet in which it is located to the mixing chamber 25 of the faucet. It is preferred that each tippable valve be held against its seat by means of a coil spring 39. The upper end of each coil spring wraps around the bushing 36 at the underside of the disc 34 and the lower end of this spring, which is of reduced diameter, rests against the upper face of a conical wire mesh screen 40. The upper rim of this screen is reinforced by means of a ring 41 which is L-shaped in cross section to provide a seat which rests against the lower end of the sleeve 30 to hold the screen in place.

Figure 2:
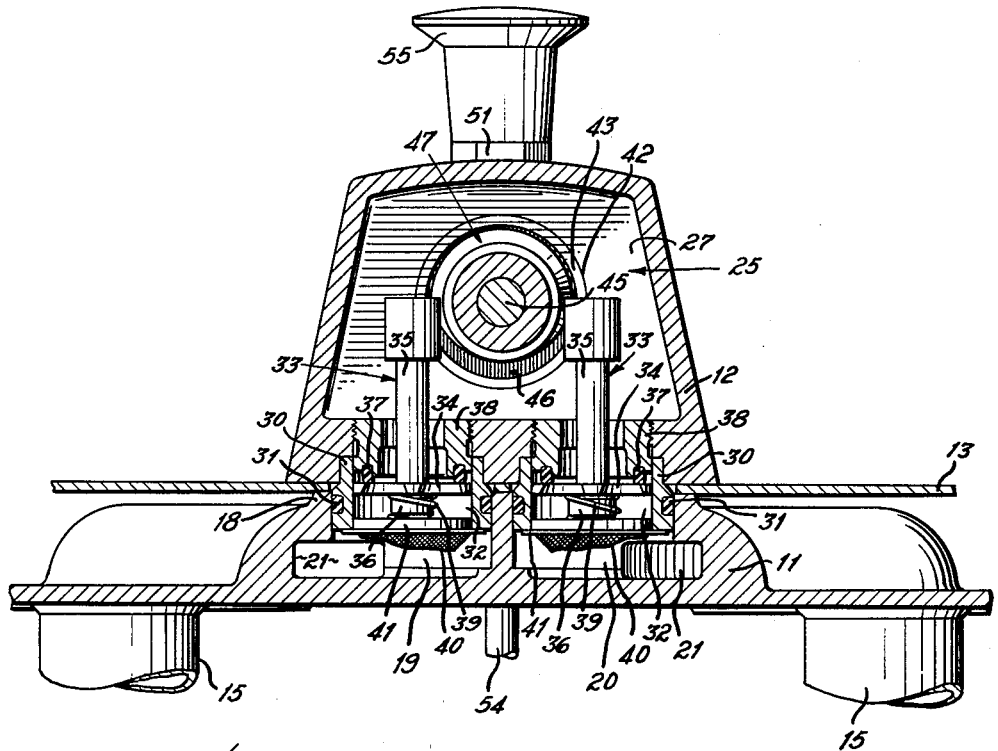
FIGURE 2 is a cross sectional view taken on the line 2—2 of FIGURE 1.
Figure 3:
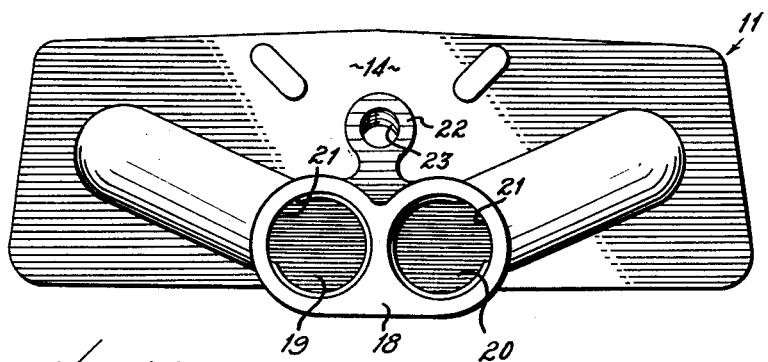
FIGURE 3 is a top plan view of the base section of the faucet.

As best shown in FIGURE 2, the two valve stems 35 extend up into the mixing chamber 25 at the two sides of a rearward extension of the longitudinal axis of the spout 24. As shown, the axes of the two valve stems are parallel and reside in a common vertical plane. This relationship is not critical. It has been determined that these stems may reside in various angular positions with respect to one another so long as they are compatible with the shape of the actuator utilized to deflect them.

The wall 27 which divides the mixing chamber 25 from the rear portion of the faucet spout has a circular opening 42 in it which receives a circular plug 43. This plug has an annular step at its periphery which receives an O-ring 44. A cylindrical stud 45 projects from the center of the plug and the axis of this stud is on the longitudinal axis of the faucet spout. The area of the forward face of the plug surrounding the stud 45 is counterbored to provide an annular channel 46. The base of this annular channel 46 serves as a stop for the inward movement of an actuator cam, designated generally by the numeral 47, which is designed to cooperate with the stems of the tippable valves in the operation of the faucet. The outer marginal area of the rear face of plug 43 is chamfered as shown at 48 to provide a seat for a dish shaped spring 49. As shown in FIGURE 1 the center of this dish shaped spring projects outwardly to provide a contact area which rests against a tubular fastener 50. The upper end of fastener 50 has a head 51 upon it and the lower end of the fastener is threaded as shown at 52. This fastener passes downwardly through an appropriate bore in the top of the faucet body, through an opening 53 in the escutcheon, and it engages into an appropriately threaded bore in the base part 23 of the faucet. This fastener 50 provides a means for securing the faucet superstructure to the base casting and it provides a lock between the two castings and the escutcheon 13. It also provides a means of applying pressure, through the dish shaped spring 49, to the plug 43 to hold it positively in place. In addition, the hollow interior of fastener 50 provides a guide for a rod 54 which is part of the pop-up valve mechanism of a typical lavatory bowl installation. As shown, the upper end of the rod 54 has a knob 55 upon it which rests upon the head 51 at the top of the cylindrical sleeve 43 when it is in the down position.

It may be seen that with the snap-in plate 28 removed, and with the tubular fastener 50 removed, access may be had to the plug 43, and through it to the inside of the mixing chamber and the hollow interior of the faucet. This provides a way of inserting the elongated actuator rod designated generally by the numeral 55 into the faucet and is an assembly expediency.

More specifically, the actuator rod 55 has an enlarged collar 56 upon it and the inner end of the rod designated 57 extends beyond the inner face of collar 56 and into a bore 58 which extends all of the way through the actuator cam 47. The inner end 57 of the actuator rod is just slightly larger than the stud 45 and it is securely attached to the actuator cam 47, whereas the stud 45 is in slip-fit relation with the bore 48 through cam 47. As shown, the forward end of the actuator cam 47 fits snugly against the collar 56.

The end of the actuator rod outwardly beyond the collar 56 is divided into two sections of different diameters, these sections being defined one from the other by a step 59 which provides an abutment shoulder, the purpose of which will be described later. The smaller diameter outer part of actuator rod 55 extends through a packing gland designated generally 60 which resides within a bore extending on through the forward end of the faucet. This latter bore is counterbored to provide a seat 61 which receives a washer 62. The rod projects through the washer and the washer serves as a stop, abutting the step 59, for the outward movement of the actuator rod. The washer 62 provides a seat for two resilient packing rings 63—63 which are V-shaped in cross section and which are held in place by means of a threaded bushing 64 which threads into the very outer end of the casting of the faucet. The outer end of bushing 64 is cupped shaped as shown in FIGURE 1 to provide a sleeve, the purpose of which will be explained. Due to the nature of the resilient packing rings 63—63 it is recommended that the bushing 64 be tightened using hand pressure only. The outer end of the actuator rod is splined as shown at 65 and it fits into a boss 66 which is at the underside of a decorative knob 67. The outer periphery of this knob is scalloped as shown at 68 to provide finger grips. The knob also has a skirt 69 on it which telescopes over the cup shaped sleeve 64 of the bushing for decorative purposes. The knob is held onto the outer end of the actuator rod by means of a bolt 70 which passes through an appropriate bore in the center of the knob and threads into the outer end 65 of the actuator rod.

Figure 5:
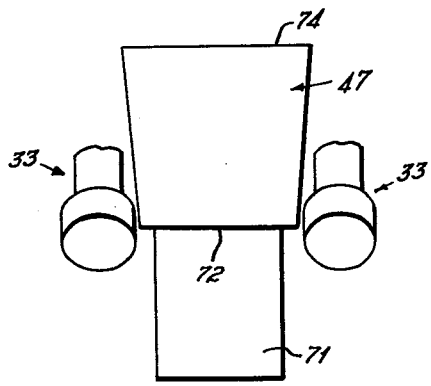
FIGURE 5 is a diagrammatic view looking down upon the ends of the valve stems and the actuator cam which is utilized to tip these stems. In this view both valves are closed.
Figure 7:
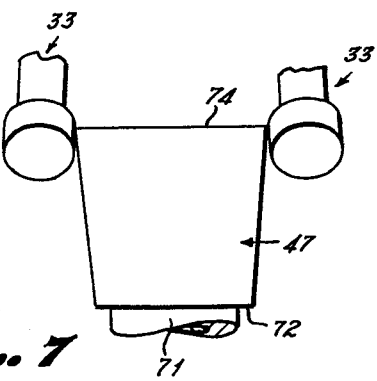
FIGURE 7 is a view similar to FIGURE 5 in which the actuator cam has been moved into a position to turn on both valves equal amounts.
Figure 6:
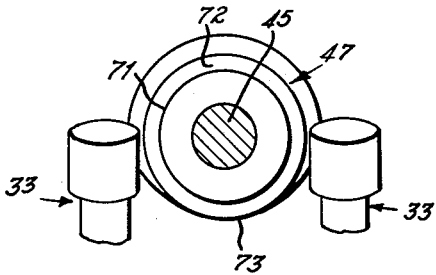
FIGURE 6 is a fragmentary diagrammatic view taken on the same plane of the line 2—2, FIGURE 1, showing the faucet in the off position of FIGURE 5.
Figure 8:
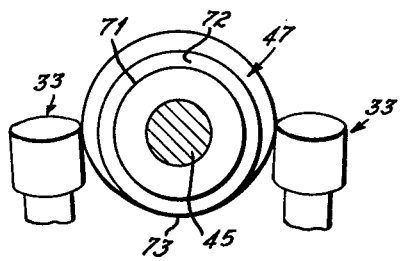
FIGURE 8 is a view similar to FIGURE 6 in which the valve stem are in the same relative positions as that shown in FIGURE 7.
Figure 9:
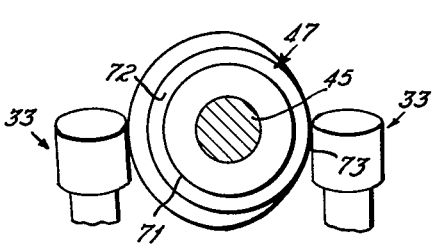
FIGURE 9 is a view similar to FIGURE 6 showing the position of the actuator cam in which the left one of the two valve stems is being tipped, whereas the right one of the two valve stems remains in its upright, closed position.
Figure 10:
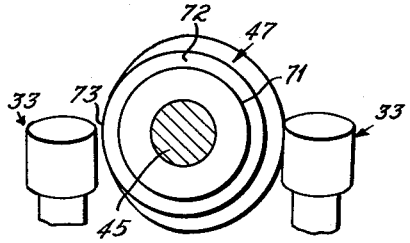
FIGURE 10 is a view similar to FIGURE 9 in which the actuator cam has been rotated into a position in which it is acting upon the right one only of the two valve stems.

The shape and function of the actuator cam employed in the faucet are best understood from FIGURES 5 through 10. The forward portion of the cam designated 71 is non-functional insofar as the valve stems are concerned and it is cylindrical and of smaller diameter than the cam itself so as to not make contact with the valve stems. The shoulder 72 which joins the cylindrical forward portion 71 of the actuator cam with the rear portion is circular, and it is centered on the center of the actuator rod. As shown in FIGURE 6 the cam is the same radius from one end to the other along a line extending longitudinally of the underside thereof. The rear end of the cam 74 follows the arc of a circle in the upper portion thereof as viewed in FIGURE 6, however, in the lower portion, i.e. below a plane passing horizontally through the cam, the curvature becomes greater so that the rear edge is no larger in radius than the forward edge. Between the front of the cam and the rear of the cam the side areas in the lower half change gradually going from the front to the back. Thus, when the cam is viewed as shown in FIGURE 5 the sides flare outwardly in equal amounts going from the front to the back. Under these circumstances, when the actuator rod is pulled straight out the two valve stems are contacted and tipped equally. Under these circumstances, equal amounts of hot and cold water enter the mixing chamber. A full On position where an equal mix is issuing from the faucet is shown in FIGURES 7 and 8. Now, when the cam is rotated toward the left as viewed in FIGURE 9 it may be seen that the part thereof which was at the bottom in FIGURES 5 and 6 is now toward the right one of the two valve stems, but since the diameter of the cam at this point is less than the space between the center of the actuating rod and the side of the valve stem there is no deflection of the right one of the two stems. However, the stem at the left, riding on the greatest radius of the cam is deflected to the fullest extent. This represents a full On position for the hot water. Referring to FIGURE 10 which shows the reverse condition, it may be seen that the stem at the left is not deflected whereas the one at the right is deflected to the full On position. Obviously, positions in between those shown at FIGURES 9 and 10 would result in varying mixtures of water, going from the full hot position shown in FIGURE 9 through the intermediate mixtures to the full cold position illustrated in FIGURE 10.

Inasmuch as there is a line contact made between the surfaces of the actuator cam and the surfaces of the valve stem it is preferred that the larger radius at the top of a stem be utilized in order to spread out the area of contact.

A comparison of FIGURES 5 and 7 will make it obvious that as the cam is pulled forward the volume of the water is increased. It therefore may be seen that the push-pull movement of the knob at the front of the faucet controls volume, whereas a dialing movement of this knob either left or right results in changes of temperature.

Having described my invention, I claim:

1. A mixing faucet comprising a base member adapted to seat upon the rear deck of a lavatory bowl, inlets for hot and cold water supply lines entering said base member, there being water passageways through said base member in communication with said inlets, an integral faucet body having a hollow interior providing a combined mixing chamber and faucet spout, means to secure said hollow faucet body upon said base member with said spout projecting upwardly and outwardly therefrom and adapted to overhang said bowl, two tippable valves seated in the respective water passageways and having stems projecting into said mixing chamber in equally spaced relation at the sides of the longitudinal axis of said faucet body, an elongated push-pull actuator rod extending longitudinally of the axis of said faucet body and extending from said mixing chamber through said spout and through the end thereof adapted to overhang said bowl, an actuator cam secured to the inner end of said actuator rod and disposed between the stems of said tippable valves, there being an opening at the rear of said faucet body to permit the initial insertion of said actuator rod and said actuator cam into the hollow interior of said faucet body, means to close and seal said opening, the last named means including means to slidably and rotatably support said actuator cam and said actuator rod at the inner end thereof, compressible sealing means at the forward end of said faucet providing a slidable and rotational support for the outer end of said actuator rod, a discharge opening at the underside of said faucet body adjacent to the forward end thereof, and a knob secured to the forward end of said actuator rod for manipulation thereof.

2. A mixing faucet as set forth in claim 1 in which said means to secure said hollow faucet member upon said base member comprises a hollow sleeve extending through the rear portion of said faucet spout and being threadedly engaged into said base member, the hollow interior of said threaded sleeve providing a guide for a lavatory pop-up valve operating rod.

3. A mixing faucet as set forth in claim 1 in which said means to secure said hollow faucet body upon said base member comprises a fastener passes downwardly through the rear portion of said faucet body into engagement with said base member to secure said faucet body to said base member.

4. A mixing faucet as set forth in claim 3 in which said fastener cooperates with said means to close and seal said opening to maintain the integrity of the seal between the last named means and the rear of said faucet body.

5. A mixing faucet as set forth in claim 4 in which said means to close and seal said opening includes a spring device contacting said fastener.

6. A mixing faucet as set forth in claim 5 in which said spring device is dish shaped with the central area only thereof in contact with said fastener.

7. A mixing faucet as set forth in claim 3 in which said fastener comprises a sleeve having the lower end thereof in threaded engagement with said base member, the hollow interior of said sleeve providing a guide for the rod of a lavatory pop-up valve.

8. A mixing faucet as set forth in claim 1 in which said means to close and seal said opening at the rear of said faucet body has a cylindrical stud thereon projecting into the mixing chamber in axial alignment with the longitudinal axis of said actuator rod, and a bore in said actuator cam receiving said stud in slip-fit relation, whereby said stud provides a journal for the rear end of said rod and actuator cam assembly.

9. A mixing faucet adapted for association with a basin for discharge of fluid into said basin comprising, a hollow faucet member having a mixing chamber in the rear portion thereof and an integral spout member projecting generally forwardly from said mixing chamber over said basin, a discharge outlet adjacent to and at the underside of the front end of said spout, means defining a passageway for water to enter said mixing chamber from a hot water supply line and means defining a passageway for water to enter said mixing chamber from a cold water supply line, a pair of tippable valves, said valves seated in said passageways and having stems projecting therefrom into said mixing chamber in spaced relation at the respective sides of the longitudinal axis of said spout, each valve adapted to open upon the tipping of its valve stem, a rotatable push-pull rod disposed axially of said spout and extending from said mixing chamber through the hollow interior of said spout and through the front end thereof, sealing means between said rod and the front end of said spout to prevent the leakage of fluid around said rod, an actuator cam at the inner end of said rod between said valve stems adapted to selectively contact and tip said valve stems, a handle secured onto the front of said rod exteriorly of said spout whereby said handle is the forwardmost element of the faucet, said valves being selectively operated by rotating and pushing and pulling said handle from the front end of said faucet above and closely adjacent to said discharge outlet, and adjustable means surrounding said rod between said handle and said spout for compressing said sealing means, whereby the force required to overcome frictional engagement between said rod and said sealing means may be varied.

10. The mixing faucet as set forth in claim 9 in which said adjustable means is seated within a hollow portion of said handle when said handle is in the off position in which there is no fluid flow from said discharge outlet.

References Cited in the file of this patent
UNITED STATES PATENTS

| | | |
|---|---|---|
| 1,591,332 | Mueller | July 6, 1926 |
| 2,616,710 | Woodruff | Nov. 4, 1952 |
| 2,866,478 | Hyde | Dec. 30, 1958 |
| 3,080,570 | Weddendorf | Mar. 12, 1963 |